Oct. 11, 1960 H. E. BESTE 2,956,203

DETECTOR

Filed Aug. 31, 1959

INVENTOR.
HAROLD E. BESTE
BY Darby & Darby
ATTORNEYS

United States Patent Office 2,956,203

Patented Oct. 11, 1960

2,956,203

DETECTOR

Harold E. Beste, Verona, N.J., assignor to Allen B. Du Mont Laboratories, Inc., Clifton, N.J., a corporation of Delaware Filed Aug. 31, 1959, Ser. No. 836,966

11 Claims. (Cl. 315—30)

This invention relates to a detector, and more particularly to one for detecting small objects.

Many types of target detectors are known, some of them, such as radar, producing spots of light, often on a grey or black background. Under some conditions, this is the only type of display possible, but it requires interpretation by the user.

A much better type of target detector is one that shows an overall display, containing the target in one part thereof. For example, a television type detector, scanning the sky, would include in its display: the horizon, clouds, and a small target spot representing an airplane, a missile, etc. This type of display requires no interpretation, since the eye readily recognizes the background and the target in relation thereto. The target spot is usually dark, like a silhouette, but it could be light, if the target happened to reflect the sunlight. The target spot would always, however, be in some contrast to its background. For convenience only, the following discussion will be presented in terms of a dark target spot.

Detectors of the above television type have one unfortunate limitation; namely, the fact that in the display the target is a tiny dot, and may not be readily seen.

It is therefore the principal object of my invention to provide an improved detector.

Figure 1:
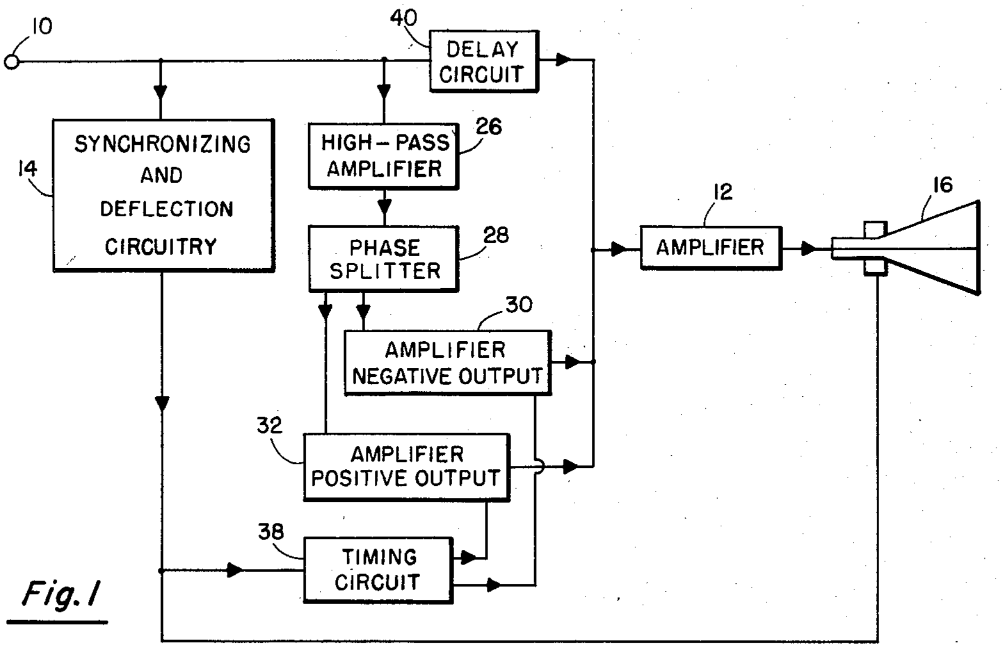
Figure 2:
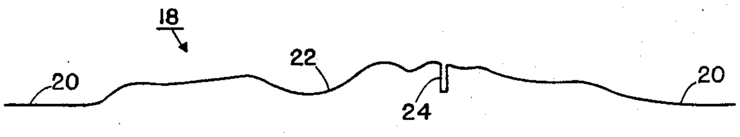
Figure 3:
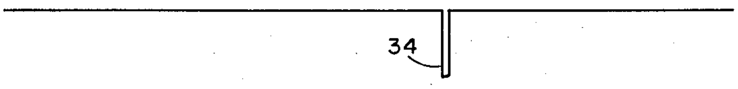
Figure 4:
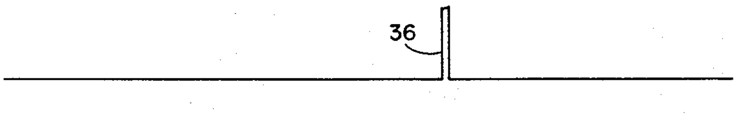

The attainment of this object and others will be realized from the following specification, taken in conjunction with the drawings, in which, Fig. 1 is a block diagram of my invention; and Figs. 2–4 are associated waveforms.

Broadly speaking, my invention contemplates circuitry that produces a display wherein the background is completely shown, and the included target dot flickers. The flickering target dot attracts attention much more readily than if it were merely a spot having fixed contrast relative to the background.

The following information will aid in understanding my invention. When a television camera scans a scene, the amplitude of the output signal is controlled by the amount of light reflected by the scene into the camera. Thus, when the camera scans across a blue sky, the output signal remains at a substantially constant amplitude. When the camera scans across a cloud, the light reflected into the camera varies from one portion of the cloud to another. While portions of the clouds range from white to dark grey when viewed by the naked eye, in a close-up view taken through a telescope or a television camera, the changes in brightness are rather gradual. Since the variations in brightness are gradual, they cause the television camera to produce a low frequency electrical output signal.

When the scanning television camera comes to the target, which looks like a spot against the background, the spot produces a sudden change in the amount of reflected light and the output signal changes abruptly from one magnitude to another. When the camera leaves the target, the amplitude of the output signal changes suddenly in the opposite sense. These sudden changes cause the television camera to produce high-frequency electrical output signals.

My invention may be readily understood by referring to Fig. 1. Since my invention uses standard television pick-up and display techniques, these will not be discussed; the explanation being directed only to that portion of the television system that embodies my invention. In Fig. 1, the received television signal applied to terminal 10 is passed through well known circuits 12 for amplifying the signals, and through other circuits 14 for synchronizing and deflecting the electron beam. These circuits coact to produce on the faceplate of cathode ray tube 16, a display wherein a small dark spot appears against a background of sky and clouds.

In Fig. 2, waveform 18 shows the output signal from the television camera for the interval that it is scanning across the portion of the sky containing the target. The level portions 20 are of a constant amplitude, representing the output signal produced by the blue sky. The undulating portion 22 represents the light reflected by various portions of the clouds, the higher amplitudes corresponding to the white cloud portions. The negative-going pulse 24 depicts the reduced reflected light from the target. (If the target were bright, pulse 24 would extend upwards.) When waveform 18 is applied to the cathode ray tube, it produces a line that (1) is relatively dark at the ends to represent the blue sky, (2) varies in brightness at the center portion in accordance with the cloud pattern, and (3) contains a dark, or bright, spot that corresponds to the position of the target.

Referring back to Fig. 1, my invention directs the received television signal through a second path that emphasizes and operates upon the higher frequencies that form the dark dot. This circuitry comprises a high-pass video amplifier 26, or, alternatively, separate filters and amplifiers. Circuitry 26 transmits only the high frequency signal components that form the target dot. The output from circuit 26 is then passed through a phase splitter 28. This unit produces a negative-going (normal polarity) and a positive-going (opposite polarity) pulse, that are in turn applied to amplifiers 30 and 32 respectively. Their outputs are shown in Figs. 3 and 4 respectively, and contain a negative-going pulse 34 and a positive-going pulse 36. These pulses are of the same width as pulse 24, but have a larger amplitude.

I then use these opposite polarity pulses to cause the target dot to flicker. To do this, timing circuit 38 cyclically energizes amplifiers 30 and 32 so that the opposite polarity output pulses thereof are alternately applied through video amplifier 12 to cathode ray tube 16. Timing circuits are well known, and frequently use flip-flop circuits, or blocking oscillators.

The flickering effect is produced as follows. The negative-going pulse 34 is of such amplitude as to momentarily cut off cathode ray tube 16. It therefore produces a black spot, instead of the erstwhile dark spot produced by the prior art circuitry. The positive-going pulse 36 is of such amplitude as to momentarily cause cathode ray tube 16 to produce a bright spot. The alternate presentation of the black and white spots causes the desired flicker.

The foregoing discussion has assumed a tiny target, and my invention therefore produces a flickering spot. If the target is larger, either actually or because of optical or electrical magnification, the aforementioned high frequency signal components would occur at the target's outline. Under these conditions, the target's outline would flicker while the brightness, or darkness, of the inner portion would remain constant.

Under some conditions, a part of the horizon, or a particular portion of a cloud may be such as to produce a high frequency that produces a flicker. These spurious results are easily discounted, since a target would have a continuous movement unlike a "horizon" flicker which remains stationary. On the other hand, the changing cloud formations will soon erase the "cloud" flicker.

I prefer that the flickering occur about fifteen times per second, at which rate it is most noticeable by the eye. To accomplish this, timing circuit 38 applies only the negative-going pulse 34 during the first $1/30$ of a second and then applies only the positive-going pulse 36 during the next $1/30$ of a second. Thus, it takes $2/30$, or $1/15$, of a second for the dot to go through a black and white cycle. The resultant flicker rate is therefore fifteen times per second. The same rate may be achieved in a "sequential frame" display, by causing each pulse to be produced during alternate frames, each of which has a duration of $1/30$ of a second.

A flicker rate of thirty times per second can be produced by causing timing circuit 38 to apply the pulses for $1/60$ of a second. The thirty cycle per second flicker rate may be readily produced in a television system that uses an "interlaced field" display. Timing circuitry 38 is then used to cause alternate fields, each of which is $1/60$ of a second long, to produce a dark spot, while the in-between fields produce a light spot.

If desired for reasons of economy, space, etc., one may eliminate the circuitry that provides a pulse of the same polarity as the target dot. Under these conditions, at one time the target dot would be normal, while subsequently it would have reversed polarity. The flicker would not be as pronounced, due to the fact that the normal picture would not have the high frequency emphasis of the reversed polarity field.

From Fig. 1, it will be seen that the prior art signal path comprising video amplifier 12 will produce the prior art display, wherein a tiny dark dot appears against the sky. The operation of my invention is such that pulses 24, 34 and 36 coincide, positionwise, with the dark spot that represents the target. If any appreciable delay is introduced by my circuitry, a corresponding delay is introduced by delay circuit 40 to produce the desired superposition.

What is claimed is:

1. In a cathode ray tube display containing a target portion, the combination comprising: means producing a normal polarity signal corresponding to said target portion; means producing a reversed polarity signal corresponding to said target portion; and means cyclically presenting said normal polarity signal and said reversed polarity signal whereby said target portion flickers.

2. In a cathode ray tube presentation containing a target having high contrast with the background and therefore producing a normal signal polarity having a high-frequency component, the combination comprising: means separating out said high-frequency component; means energized by said high-frequency component for producing an opposite polarity signal; and means alternately applying said normal and said opposite polarity signals to said cathode ray tube.

3. In a cathode ray tube presentation containing a target having high contrast with the background and therefore producing a normal polarity signal having a high-frequency signal component, the combination comprising: means separating out said high-frequency component; means energized by said high-frequency component, for producing a normal polarity signal and an opposite polarity signal; means alternately applying said normal and said opposite polarity signals to said cathode ray tube.

4. In a cathode ray tube display containing a target portion, the combination comprising: means producing a high-frequency normal polarity signal for said target portion; means amplifying said normal polarity signal; means producing a high-frequency reversed polarity signal for said target portion; means amplifying said reversed polarity signal; means cyclically applying to said cathode ray tube, said amplified normal polarity signal and said reversed polarity signal, whereby said target portion is alternately bright and dark, thus causing said target portion of said display to flicker and be readily seen.

5. In a cathode ray tube display containing a target portion, the combination comprising: means producing a high-frequency normal polarity signal for said target portion; means amplifying said normal polarity signal; means producing a high-frequency reversed polarity signal for said target portion; means amplifying said reversed polarity signal; means cyclically applying to said cathode ray tube, said amplified normal polarity signal and said amplified reversed polarity signal, said last means comprising a timing circuit, whereby said target portion is alternately bright and dark, thus causing said target portion of said display to flicker and be readily seen.

6. The combination of claim 5 wherein said timing circuit produces a 15 cycle per second flicker.

7. The combination of claim 5 wherein said timing circuit produces a 30 cycle per second flicker.

8. In a cathode ray tube presentation containing a target having high contrast with the background and therefore producing high-frequency signal components, the combination comprising: means amplifying only said high frequency components; means energized by said amplifier, producing signals having opposite polarities; means amplifying each said opposite polarity signals; and timing means cyclically applying said opposite polarity signals to said cathode ray tube.

9. The combination of claim 8 wherein said timing means produces a 15 cycle per second flicker.

10. The combination of claim 8 wherein said normal and said opposite polarity signals are applied in alternate fields.

11. The combination of claim 8 wherein said normal and said opposite polarity signals are applied in alternate frames.

No references cited.